No. 624,438. Patented May 2, 1899.
J. E. CRANE.
SEPARATOR FOR BEEHIVE HONEY SECTIONS.
(Application filed Dec. 24, 1898.)
(No Model.)
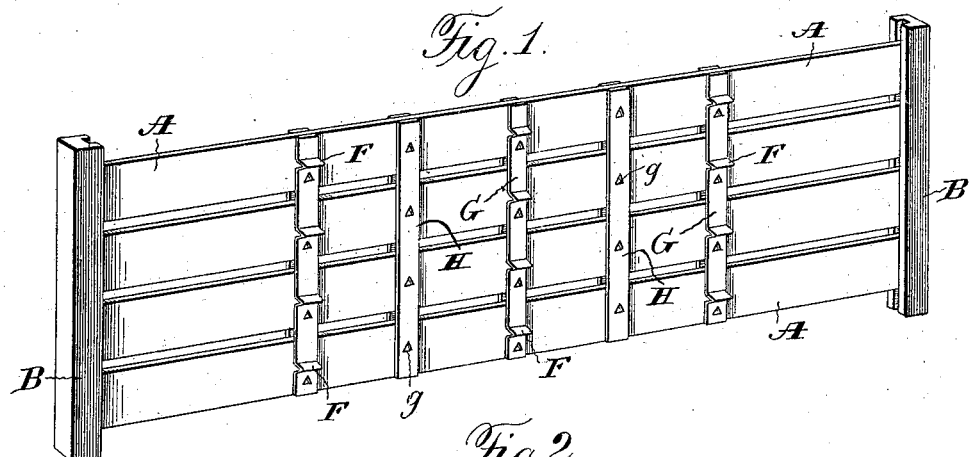
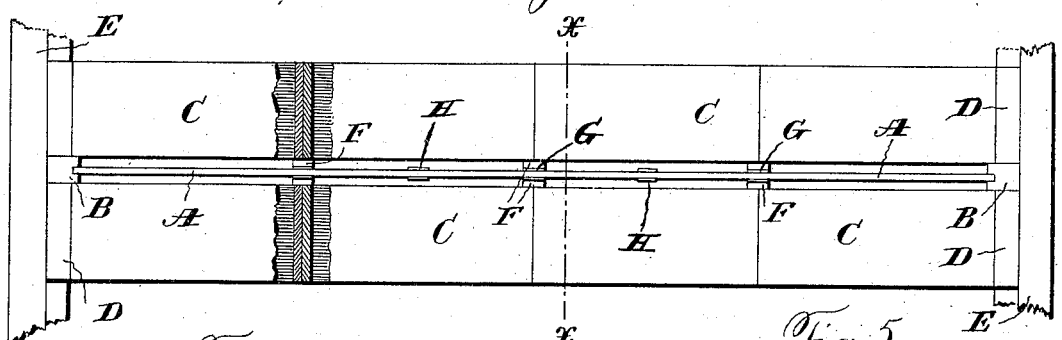
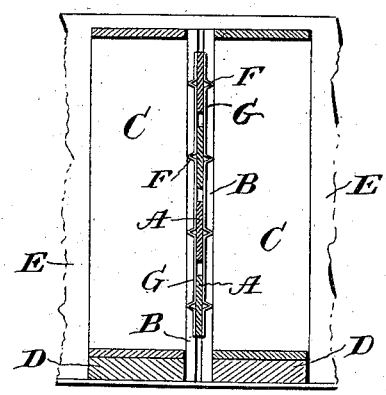
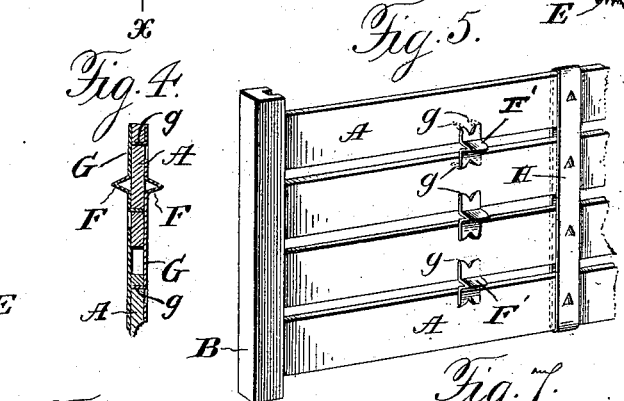
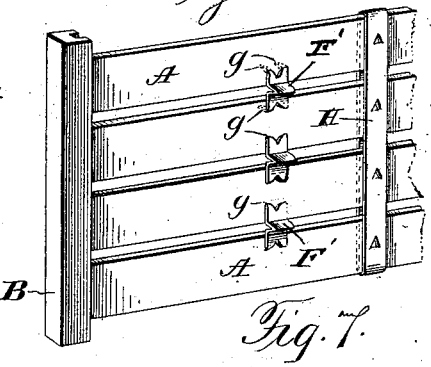
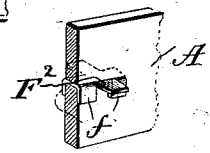
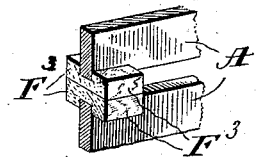
Witnesses:
Jas E Hutchinson
Henry C. Hazard
Inventor
James E. Crane, by
Crindle and Russell, his Attys United States Patent Office.

JAMES E. CRANE, OF MIDDLEBURY, VERMONT.

SEPARATOR FOR BEEHIVE HONEY-SECTIONS.

SPECIFICATION forming part of Letters Patent No. 624,438, dated May 2, 1899.

Application filed December 24, 1898. Serial No. 700,192. (No model.)

*To all whom it may concern:*

Be it known that I, JAMES E. CRANE, of Middlebury, in the county of Addison, and in the State of Vermont, have invented certain new and useful Improvements in Separators for Beehive Honey-Sections; and I do hereby declare that the following is a full, clear, and exact description thereof, reference being had to the accompanying drawings, in which—

Figure 1 is a perspective view of a separator embodying my invention; Fig. 2, a top plan view of a portion of a superbox containing sections, showing the separator as arranged for use; Fig. 3, a section on the line $x\ x$ of Fig. 2; Fig. 4, a detail view, in vertical section, of a portion of said separator; Fig. 5, a detail view in perspective of a portion of a separator containing another embodiment of my invention; Fig. 6, a like view of a separator provided with a different form of section-engaging projection from what is shown in the other figures, and Fig. 7 a similar view of still another form of such feature of my invention.

Letters of like name and kind refer to like parts in each of the figures.

The object of my invention is to improve the construction of separators used in beehives between the rows of honey-sections, so as to give as complete direct access as possible to the bees from one section of a row to the other sections thereof, to the end that better and more work may be done by the bees, and yet without in any degree impairing the efficiency of the separators, and also to strengthen or stiffen separators made of thin strips of wood; and to these ends my invention consists in the separator and in the combination thereof with the honey-sections of a beehive, substantially as hereinafter specified.

It is known that bees work faster and produce a better product if permitted to work in a large open space; but as the trade demands that honey shall be put up in small packages it is impracticable, in order to comply with such demand, to have the bees work in such a space in a hive, because to prevent the formation of the honeycomb in a large mass honey-sections of a size to hold usually a pound of honey each are placed in the hive and the honey is stored in them and not in a mass, rows of boxes or sections being placed in the hive and the sections of the different rows being separated by partitions called "separators." It is desirable, of course, though the conditions obtaining in a large open space are thus impracticable of attainment, that conditions be secured as nearly like them as is possible in so far as such may be compatible with proper or satisfactory filling of the sections. An important consideration to this end is the permitting of perfect freedom of movement of the bees through the hive, and I provide a construction of separator that enables perfect access from section to section of the same row, as well as from row to row.

In the carrying of my invention into practice I employ the style of separator commonly known as the "fence," because of its resemblance to a fence, it being composed of thin parallel slats or strips A and A of wood, secured together at the ends by vertical wooden bars or posts B and B, spaces being provided between adjoining slats or strips to enable the passage of bees from a section on one side to a section on the other side. As illustrated in Figs. 2 and 3, the sections C and C are placed end to end in parallel rows, each row being supported on a frame D, that is suitably supported at its ends on projections from the sides of the super E.

As heretofore made, separators of the kind above described have had at points between the ends vertical cleats or bars extending continuously from top to bottom to abut against the side edges of the honey-sections, and hence such cleats or bars form a barrier to the ready and direct passage of bees from the section of one row to an adjoining one of the same row. This barrier to the free and direct passage of the bees from one section to another of the same row is objectionable, and yet it is necessary in order to secure the proper filling of the sections with honey to keep the separator a proper distance from the sections. I attain the important object of permitting the direct and free passage of the bees and also preserve the required space between the sections and the separator by employing a number of separated projections or lugs on the sides of the separator, arranged in a vertical line in position to abut against the edges of the sides of the sections C and C. Preferably said projections or lugs are quite small in size vertically, so that ample space will exist between them for the passage of bees longitudinally of the separator or crosswise of the super.

The lugs or projections can be made of wood or metal and constructed and applied to the separator in a great variety of ways. An admirable construction is shown in Figs. 1 to 3, in which each series of projections is formed on a strip of tin or other sheet metal, that is crimped transversely at several separated points to form the projections F and F, which are given the shape of V-shaped ribs. Said strip is of a length to extend vertically across all of the slats A and A and, being fastened thereto, forms a connection between them that greatly stiffens or braces the separator, holding the strips thereof in proper position and restraining warping. The rigidity or stiffness of the strip itself is augmented by the crimping to form the V-shaped ribs. A simple, cheap, and efficient way of fastening the strip G to the slats is to punch or cut and bend from the body of the strip V-shaped tongues or teeth $g$ and $g$, that are forced into the slats. Two alining strips G and G, on opposite sides, can be made in one continuous piece, that is bent to pass around the separator, or, as shown, each strip can be separate from the other. Of course I do not limit myself to the use of such fastening means as the integral teeth $g$ and $g$; but the latter are preferred, as thus I secure in a single piece the section-engaging lugs or projections suitably spaced, the stiffening or bracing strip, and the means of connection or fastening to the separator. The advantage in respect to rapidity and cheapness of work which is secured by being able to apply an entire series of projections to the separator at once is apparent.

I show in Fig. 5 a construction where the projections are made separate from each other, tin or other sheet metal being used and the mode of constructing the projections being essentially like that where a strip of tin G is used. In the case shown in Fig. 5 a short strip of tin is used, that is crimped to form a transversely-extending V-shaped rib, and each end of the strip is cut to form teeth, essentially like the teeth $g$ and $g$. In applying the device shown in Fig. 5 its teeth at both ends are thrust, respectively, into adjoining slats A and A, and hence the device bridges over the space between adjoining slats, the projection F' coming opposite said space.

Another form of separate projection or lug $F^2$ is shown in Fig. 6, which consists of a piece of sheet metal that is thrust horizontally through a slit in the slat A, so as to project on both sides thereof, and is fastened in place by one or more tongues $f$ and $f$, bent against the sides of the slat, the piece of metal being suitably cut or slit before it is applied to the slat to form such tongues and enable them to be bent to place.

In Fig. 7 I show the lugs or projections as made of small blocks of wood, each projection $F^3$ being, in the case illustrated, formed of two pieces fitted into the space between adjoining slats, the upper side of one piece and the under side of the other being grooved to enable them to respectively engage the edges of said slats. The blocks are glued to the latter.

When the projections are in the form of separate or independent pieces, it is desirable to apply to the separator stiffening or bracing strips H and H, that connect the slats, and as preferably made such strips are of tin or other thin metal and differ from the strips G and G only in that they lack the lugs or projections F and F. The strips H and H may be used even when the strips G and G, carrying the projections F and F, are employed, and also in constructing slatted or fence-form separators that have no projections or lugs. In all of these cases the strips H and H, being applied to the separator at points not opposite the sides of the sections C and C and being very thin, will be entirely unobjectionable.

It will be apparent that not only does my invention secure the object aimed at of enabling the direct access of bees from section to section of the same row, as well as from row to row, but in some of its embodiments becomes an important element of strength to the separator and that the latter can be cheaply made when containing my invention.

Having thus described my invention, what I claim is—

1. A section-separator for beehives, provided with section-engaging projections that are in different horizontal planes, substantially as and for the purpose described.

2. A section-separator for beehives, having passages from side to side and provided with section-engaging projections that are in different horizontal planes, substantially as and for the purpose described.

3. A section-separator for beehives, comprising slats separated by longitudinal spaces, and having section-engaging projections that are in different horizontal planes, substantially as and for the purpose described.

4. A section-separator for beehives, comprising slats separated by longitudinal spaces, and sheet-metal strips connecting such slats, substantially as and for the purpose described.

5. A section-separator for beehives, comprising slats separated by longitudinal spaces, and strips connecting such slats, and section-engaging projections that are in different horizontal planes, substantially as and for the purpose described.

6. A section-separator for beehives, provided with strips having integral section-engaging projections, substantially as and for the purpose described.

7. A section-separator for beehives, comprising slats separated by longitudinal spaces, and strips connecting such slats having integral section-engaging projections, substantially as and for the purpose described.

8. A section-separator for beehives, comprising slats separated by longitudinal spaces, and metal strips connecting such slats, crimped to form section-engaging projections, substantially as and for the purpose described.

9. In a beehive, the combination of sections and a section-separator, comprising slats separated by longitudinal spaces, and united by strips that are to one side of the section sides, substantially as and for the purpose described.

10. In a beehive, the combination of sections in parallel rows, and a section-separator having projections on its side that engage the section sides at points that are separated vertically, substantially as and for the purpose described.

In testimony that I claim the foregoing I have hereunto set my hand this 22d day of December, A. D. 1898.

JAMES E. CRANE.

Witnesses:
C. J. WILLIAMSON,
JAS. E. HUTCHINSON.